United States Patent
Galvan et al.

(10) Patent No.: US 10,767,036 B2
(45) Date of Patent: Sep. 8, 2020

(54) POLYOLEFIN COMPOSITION FOR FIBERS

(71) Applicant: BASELL POLIOLEFINE ITALIA S.R.L., Milan (IT)

(72) Inventors: Monica Galvan, Ferrara (IT); Claudio Cavalieri, Ferrara (IT); Jaume Marti Porqueres, Reus (ES); Renaud Lemaire, Brussels (BE); Roberto De Palo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/629,104

(22) PCT Filed: Jun. 20, 2018

(86) PCT No.: PCT/EP2018/066391
§ 371 (c)(1),
(2) Date: Jan. 7, 2020

(87) PCT Pub. No.: WO2019/007684
PCT Pub. Date: Jan. 10, 2019

(65) Prior Publication Data
US 2020/0165424 A1    May 28, 2020

(30) Foreign Application Priority Data
Jul. 7, 2017 (EP) .................................... 17180217

(51) Int. Cl.
*C08L 23/12* (2006.01)
*C08L 23/08* (2006.01)
*C08L 23/14* (2006.01)

(52) U.S. Cl.
CPC ........... *C08L 23/12* (2013.01); *C08L 23/0815* (2013.01); *C08L 23/14* (2013.01); *C08L 2203/12* (2013.01); *C08L 2205/035* (2013.01); *C08L 2207/064* (2013.01)

(58) Field of Classification Search
CPC ...... C08L 23/08; C08L 23/10; C08L 2205/02; C08L 2205/03; C08L 2203/16
See application file for complete search history.

(56) References Cited

U.S. PATENT DOCUMENTS

| | | | | |
|---|---|---|---|---|
| 7,981,982 B2* | 7/2011 | Cagnani | ............... | C08F 210/16 526/64 |
| 10,501,616 B2* | 12/2019 | Galvan | ................... | C08L 23/10 |
| 2004/0041299 A1* | 3/2004 | Kim | .......................... | C08J 5/18 264/176.1 |
| 2015/0166778 A1* | 6/2015 | Fantinel | .............. | C08L 23/0815 428/36.9 |
| 2015/0232643 A1* | 8/2015 | Herklots | ................. | B29C 43/00 264/523 |
| 2016/0347941 A1* | 12/2016 | Nakajima | ............ | C08K 5/0083 |
| 2019/0284383 A1* | 9/2019 | Galvan | ................... | C08L 23/16 |

FOREIGN PATENT DOCUMENTS

| | | | | |
|---|---|---|---|---|
| CN | 1383442 A | 12/2002 | | |
| CN | 101321825 A | 12/2008 | | |
| EP | 2540499 A1 * | 1/2013 | ............ | B32B 27/34 |
| EP | 2676972 A1 | 12/2013 | | |
| WO | WO-2006062956 A2 * | 6/2006 | ............ | C08F 10/00 |
| WO | 2013189960 A1 | 12/2013 | | |
| WO | 2016207235 A1 | 12/2016 | | |
| WO | 2016207236 A1 | 12/2016 | | |

OTHER PUBLICATIONS

International Search Report and Written Opinon dated Jul. 18, 2018 (Jul. 18, 2018) for Corresponding PCT/EP2018/066391.

* cited by examiner

*Primary Examiner* — Michael M Dollinger

(57) ABSTRACT

A polyolefinic fiber made from or containing from 2 wt % to 20 wt % relative to the total weight of the fiber of a polyolefin composition made from or containing:
A) 5-35% by weight of a propylene homopolymer or a propylene ethylene copolymer;
B) 20-50% by weight of a copolymer of ethylene and a $C_3$-$C_8$ alpha-olefin containing from 0.1% to 20% by weight of alpha-olefin units and containing 25% by weight or less of a fraction soluble in xylene at 25° C.; and
C) 30-60% by weight of a copolymer of ethylene and propylene containing from 25% to 75% by weight of ethylene units and containing from 40% to 95% by weight of a fraction soluble in xylene at 25° C.;
the amounts of (A), (B) and (C) being referred to the total weight of (A)+(B)+(C), the sum of the amount of (A)+(B)+(C) being 100.

15 Claims, No Drawings

POLYOLEFIN COMPOSITION FOR FIBERS

This application is the U.S. National Phase of PCT International Application PCT/EP2018/066391, filed Jun. 20, 2018, claiming benefit of priority to European Patent Application No. 17180217.6, filed Jul. 7, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to fibers made from or containing a polyolefin composition.

BACKGROUND OF THE INVENTION

In some instances, polyolefin fibers, including polypropylene fibers, are used for the production of non-woven fabric.

SUMMARY OF THE INVENTION

In a general embodiment, the present disclosure provides a composition made from or containing propylene-base polymers and linear low-density polyethylene (LLDPE). In some embodiments, the composition is used as a soft modifier in a polyolefin composition for fibers.

In some embodiments, the present disclosure provides a polyolefinic fiber made from or containing from 2 wt % to 20 wt % relative to the total weight of the fiber of a polyolefin composition made from or containing:

A) 5-35% by weight of a propylene homopolymer or a propylene ethylene copolymer containing 90% by weight or more of propylene units; component A) containing 10% by weight or less of a fraction soluble in xylene at 25° C. ($XS_A$), both the amount of propylene units and of the fraction $XS_A$ being referred to the weight of A);

B) 20-50% by weight; of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and C) 30-60% by weight of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);

the amounts of (A), (B) and (C) being referred to the total weight of (A)+(B)+(C), the sum of the amount of (A)+(B)+(C) being 100.

DETAILED DESCRIPTION OF THE INVENTION

In some embodiments, the present disclosure provides a polyolefinic fiber made from or containing from 2 wt % to 20 wt % relative to the total weight of the fiber of a polyolefin composition made from or containing:

A) 5-35% by weight; alternatively 10-30% by weight; alternatively 15-23% by weight of a propylene homopolymer or a propylene ethylene copolymer containing 90% by weight or more, alternatively 95% by weight or more; alternatively 97% by weight or more of propylene units; component A) containing 10% by weight or less, alternatively 8 wt % or less more, alternatively 6 wt % or less, alternatively 5 wt % or less of a fraction soluble in xylene at 25° C. ($XS_A$), both the amount of propylene units and of the fraction $XS_A$ being referred to the weight of A);

B) 20-50% by weight; alternatively 25-45% by weight; alternatively 30-40% by weight of a copolymer of ethylene and a $C_3$-$C_8$ alpha-olefin containing from 1.0% to 20% by weight; alternatively from 5% to 15% by weight; alternatively from 6% to 15% by weight, alternatively from 7% to 12% by weight of alpha-olefin units and containing 25% by weight or less; alternatively from 20% by weight or less; alternatively 17% by weight or less of a fraction soluble in xylene at 25° C. ($XS_B$), both the amount of alpha-olefin units and of the fraction $XS_B$ being referred to the weight of (B); and C) 30-60% by weight; alternatively 35-55% by weight; alternatively 40-50% by weight of a copolymer of ethylene and propylene containing from 25% to 75% by weight; alternatively from 37% to 65% by weight; alternatively from 45% to 58% by weight of ethylene units and containing from 40% to 95% by weight of a fraction soluble in xylene at 25° C. ($XS_C$), both the amount of ethylene units and of the fraction $XS_C$ being referred to the weight of (C);

the amounts of (A), (B) and (C) being referred to the total weight of (A)+(B)+(C), the sum of the amount of (A)+(B)+(C) being 100.

In some embodiments, component (A) is a propylene homopolymer. In some embodiments, component (A) has a melt flow rate (230° C./2.16 kg) ranging between 50 and 200 g/10 min; alternatively between 80 and 170 g/10 min.

In some embodiments, components (A)+(B) blended together have a melt flow rate (ISO 1133, 230° C./2.16 kg) between 0.1 and 70 g/10 min. alternatively between 1 and 50 g/10 min; alternatively between 8 and 40 g/10 min.

In some embodiments, component B) has a density (determined according to ISO 1183 at 23° C.) of from 0.940 to 0.965 g/cm³. Component B) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene; alternatively, 1-butene 1-hexene and 1-octene; alternatively, 1-butene.

In some embodiments, the polyolefin composition has a melt flow rate (ISO 1133, 230° C./2.16 kg) between 0.5 to 25 g/10 min, alternatively from 0.8 to 20.0 g/10 min; alternatively from 1.0 to 18.0 g/10 min.

In some embodiments, the polyolefin composition has an intrinsic viscosity [η] (measured in tetrahydronaphthalene at 135° C.) of the xylene soluble fraction at 25° C. between 1.5 to 4.0 dl/g, alternatively between 2.0 and 3.5 dl/g; alternatively between 2.1 and 2.8 dl/g.

As used herein, the term "copolymer" refers to polymers containing two kinds of comonomers such as propylene and ethylene or ethylene and 1-butene.

In some embodiments, the polyolefinic fiber is made from or contains from 2 wt % to 20 wt %, alternatively from 3 wt % to 15 wt %; alternatively from 4 wt % to 12 wt %, relative to the total weight of the fiber of the polyolefin composition.

In some embodiments, the polyolefin composition is prepared by a sequential polymerization, including at least three sequential steps, wherein components (A), (B) and (C) are prepared in separate subsequent steps, operating in each step, except the first step, in the presence of the polymer formed and the catalyst used in the preceding step. In some embodiments, the catalyst is added to the first step and not a subsequent step. In some embodiments, the catalyst remains active for the subsequent steps.

In some embodiments, the polymerization is selected from continuous or batch processes. In some embodiments, the polymerization is carried out in liquid phase, in gas phase, or by mixed liquid-gas techniques. In some embodiments, the polymerization is carried out in the presence or not of inert diluent. In some embodiments, the polymerization is carried out in gas phase.

In some embodiments, the reaction temperature is from 50 to 100° C. In some embodiments, the reaction pressure is atmospheric or higher.

In some embodiments, the regulation of the molecular weight is carried out by using molecular weight regulators. In some embodiments, the molecular weight regulator is hydrogen.

In some embodiments, the polymerizations are carried out in the presence of a Ziegler-Natta catalyst. In some embodiments, a Ziegler-Natta catalyst is made from or contains the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from compounds of Ti, V, Zr, Cr and Hf. In some embodiments, the transition metal is supported on $MgCl_2$.

In some embodiments, the catalysts are made from or contain the product of the reaction of the organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the polymer composition B) is obtained by using a Ziegler-Natta polymerization catalyst, alternatively a Ziegler-Natta catalyst supported on $MgCl_2$, alternatively a Ziegler-Natta catalyst made from or containing the product of reaction of:

1) a solid catalyst component made from or containing a Ti compound and an electron donor (internal electron-donor) supported on $MgCl_2$;

2) an aluminum alkyl compound (cocatalyst); and, optionally, 3) an electron-donor compound (external electron-donor).

In some embodiments, the solid catalyst component (1) contains as electron-donor a compound selected from the group consisting of ethers, ketones, lactones, compounds containing N, P and/or S atoms, and mono- and dicarboxylic acid esters.

In some embodiments, the catalysts are selected from the catalysts described in U.S. Pat. No. 4,399,054 and European Patent No. 45977.

In some embodiments, the electron-donor compounds are selected from the group consisting of phthalic acid esters and succinic acid esters. In some embodiments, the electron-donor compound is diisobutyl phthalate.

In some embodiments, the succinic acid esters are represented by the formula (I):

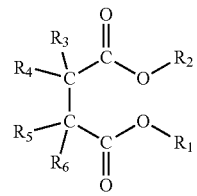

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$, which are joined to the same carbon atom, to form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, the at least two radicals different from hydrogen are linked to different carbon atoms (a) $R_3$ and $R_5$ or (b) $R_4$ and $R_6$.

In some embodiments, other electron-donors are the 1,3-diethers described in published European Patent Application Nos. EP-A-361 493 and 728769.

In some embodiments, cocatalyst (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are made from or contain aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula $R^1_a R^2_b Si(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

In some embodiments, the fiber is made from or contains from 98 wt % to 80 wt %; alternatively from 95 wt % to 85 wt % alternatively from 92 wt % to 88 wt %, of a propylene homopolymer or copolymer D) having a fraction soluble in xylene at 25° C. lower than 10 wt %, alternatively lower than 8 wt % more, alternatively lower than 4 wt %, wherein the sum of the polyolefin composition and the propylene homo or copolymer being 100 wt %. In some embodiments, a propylene homopolymer D) is used.

In some embodiments, the propylene copolymer D) contains from 0.5 wt % to 10.0 wt %, alternatively from 1.0 wt % to 6.0 wt %; alternatively from 1.5 wt % to 4.5 wt %, of ethylene or $C_4$-$C_8$ alpha-olefin derived units. In some embodiments, the alpha-olefin comonomers are selected from the group consisting of 1-butene, 1-pentene, 4-methyl-1-pentene, 1-hexene and 1-octene. In some embodiments, the alpha-olefin comonomers are selected from the group consisting of 1-butene and 1-hexene. In some embodiments, the comonomer is ethylene.

In some embodiments, the propylene homo or copolymer D) has a melt flow rate (ISO 1133, 230° C./2.16 kg) between 7 and 50 g/10 min, alternatively ranging from 12 to 40 g/10 min; alternatively from 15 to 30 g/10 min.

The following examples are given in order to illustrate, but not limit the present disclosure.

EXAMPLES

Characterizations

Xylene-Insoluble and Soluble Fraction at 25° C. (XS or Xs)

2.5 g of polymer and 250 cm$^3$ of o-xylene were introduced in a glass flask equipped with a refrigerator and a magnetic stirrer. The temperature was raised in 30 minutes from room temperature up to the boiling point of the solvent (135° C.). The resulting clear solution was then kept under reflux and stirring for further 30 minutes. The closed flask was then kept in a thermostatic water bath at 25° C. for 30 minutes, thereby permitting the insoluble (XI) part to crystallize. The resulting solid was filtered on quick filtering paper. 100 cm$^3$ of the filtered liquid was poured in a previously weighed aluminum container which was heated on a heating plate under nitrogen flow, to remove the solvent by evaporation. The container was then kept in an oven at 80° C. under vacuum to dryness until a constant weight was obtained. The percent by weight of polymer soluble and insoluble in xylene at 25° C. were then calculated.

XS of components B) and C) have been calculated by using the formula;

$$XStot = WaXSA + WbXSB + WcXSC$$

wherein Wa, Wb and Wc are the relative amount of components A, B and C (A+B+C=1)

Melt Flow Rate (MFR)

Measured according to ISO 1133 at 230° C. with a load of 2.16 kg, unless otherwise specified.

Intrinsic Viscosity IV

The sample was dissolved in tetrahydronaphthalene at 135° C. and then poured into a capillary viscometer. The viscometer tube (Ubbelohde type) was surrounded by a cylindrical glass jacket; this setup allowed temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp and the efflux time was registered: is the efflux time was converted into a value of intrinsic viscosity through Huggins' equation (Huggins, M. L., J. Am. Chem. Soc., 1942, 64, 2716) using the flow time of the pure solvent at the same experimental conditions (same viscometer and same temperature). A single polymer solution was used to determine $[\eta]$.

Comonomer (C2 and C4) Content

Comonomer ($C_2$ and $C_4$) Content

The content of comonomers was determined by infrared spectroscopy by collecting the IR spectrum of the sample vs. an air background with a Fourier Transform Infrared spectrometer (FTIR). The instrument data acquisition parameters were:

purge time: 30 seconds minimum
collect time: 3 minutes minimum
apodization: Happ-Genzel
resolution: 2 cm$^{-1}$.

Sample Preparation—Using a hydraulic press, a thick sheet was obtained by compression molding about 1 g of sample between two aluminum foils. A small portion was cut from the resulting sheet to mold a film. The film thickness was set to have a maximum absorbance of the $CH_2$ absorption band at ~720 cm$^{-1}$ of 1.3 a.u. (% Transmittance>5%). Molding conditions were a temperature of 180±10° C. (356° F.) and a pressure around 10 kg/cm$^2$ (142.2 PSI) for about one minute. The pressure was then released. The sample was removed from the press and cooled to room temperature. The spectrum of pressed film sample was recorded in absorbance vs. wavenumbers (cm$^{-1}$). The following measurements were used to calculate ethylene ($C_2$) and 1-butene ($C_4$) contents:

a) Area ($A_t$) of the combination absorption bands between 4482 and 3950 cm$^{-1}$ which was used for spectrometric normalization of film thickness.
b) Area ($A_{C2}$) of the absorption band due to methylenic sequences ($CH_2$ rocking vibration) in the range 660 to 790 cm$^{-1}$ after a proper digital subtraction of an isotactic polypropylene (IPP) and a $C_2C_4$ references spectrum.
c) The factor of subtraction ($FCR_{C4}$) between the spectrum of the polymer sample and the $C_2C_4$ reference spectrum. The reference spectrum was obtained by digital subtraction of a linear polyethylene from a $C_2C_4$ copolymer to extract the $C_4$ band (ethyl group at ~771 cm-1).

The ratio $A_{C2}/A_t$ was calibrated by analysing ethylene-propylene standard copolymers of reference compositions, as determined by NMR spectroscopy.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150).

To calculate the ethylene ($C_2$) and 1-butene ($C_4$) content, calibration curves were obtained by using reference samples with ethylene and 1-butene detected by $^{13}$C-NMR.

Calibration for ethylene—A calibration curve was obtained by plotting $A_{C2}/A_t$ versus ethylene molar percent (% C2m), and the coefficients $a_{C2}$, $b_{C2}$ and $C_{C2}$ were then calculated from a "linear regression".

Calibration for 1-butene—A calibration curve was obtained by plotting $FCR_{C4}/A_t$ versus butane molar percent (% $C_4$m) and the coefficients $a_{C4}$, $b_{C4}$ and $C_{C4}$ were then calculated from a "linear regression".

The spectra of the evaluated samples were recorded and then ($A_t$), ($A_{C2}$) and ($FCR_{C4}$) were calculated.

The ethylene content (% molar fraction C2m) of the sample was calculated as follows:

$$\% \ C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction C4m) of the sample was calculated as follows:

$$\% \ C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

$a_{C4}$, $b_{C4}$, $c_{C4}$, $a_{C2}$, $b_{C2}$, $c_{C2}$ are the coefficients of the two calibrations.

Changes from mol % to wt % were calculated by using molecular weights of the compounds.

Amount (wt %) of comonomer of components A-C were calculated by using the following relationship:

Com$_{tot}$=WaComA+WbComB+WcComC wherein Wa, Wb and We are the relative amount of components A, B and C (A+B+C=1)

Com$_{tot}$, ComA, ComB, ComC are the amounts of comonomer in the composition (tot) and in components A-C.

Titer of Filaments

From a 10 cm long roving, 50 fibers are randomly chosen and weighed. The total weight of the 50 fibers, expressed in mg, is multiplied by 2, thereby obtaining the titer in dtex.

Tenacity and Elongation at Break of Filaments

From a 500 m roving, a 100 mm-long segment was cut and single fibers randomly chosen. Each single fiber was fixed to the clamps of a Dynamometer and tensioned to break with a traction speed of 20 mm/min for elongations lower than 100% and 50 mm/min for elongations greater than 100%, the initial distance between the clamps being of 20 mm. The ultimate strength (load at break) and the elongation at break were determined in machine (MD) direction.

The tenacity was calculated by the following equation:

Tenacity=Ultimate strength(cN)×10/Titer(dtex).

Maximum Spinning Speed

The maximum spinning speed indicated the spinnability of the propylene polymer composition. The value corresponded to the highest spinning rate maintained for 30 minutes with no filament break Softness As used herein, softness index is a measure of flexibility of fibers, calculated as weight [1/g] of a bundle. The apparatuses used for such analysis are the following:

Twist measuring device (Torcimetro by Negri e Bossi Spa)

Analytical balance (by Mettler)

Softness tester (by Clark).

The sample was prepared by providing a fiber bundle of about 4,000 dtex in linear density and 0.6 m in length. The ends of the bundle were fixed on the clamps of the twist measuring device and 120 leftward twist runs were applied. The twisted bundle was taken off from the device while avoiding any untwisting. The two ends of the twisted bundle were taken in the same side and the halves winded around each other until the bundle assumed a stable form of a cord. Three specimens were prepared. The bundle were bent in two and the ends were fixed between the rolls of the Clark softness tester, leaving a distance of 1 cm between the two halves. The plane of the device was rotated rightward and stopped, when the bundle reverses the bundle's bending direction, taking note of the rotation angle (a). Subsequently the plane rotated leftward and again stopped, when the bundle reverses the bundle's bending side. The rotation angle (b) was noted. The height of the bundle above the two rolls was adjusted so to have the sum a±b equal to 90°+/−1° and this height was measured with a device having a sensitivity of 1 mm. Each of the two angles, a and b, did not exceed the limits of 45°+/−15°. The bundle was taken off from the device and cut to an height corresponding to the previously-measured height. The cut bundle was weighed by an analytical balance with a precision of 0.1 mg. The Softness index was calculated from: S.I.=(1/W)*100, wherein W is the weight, in grams, of the cut bundle. The final result was the average of the 3 specimens. The sensitivity in measuring the bundle weight was 0.1 mg Examples 1—Preparation of Polyolefin Composition Catalyst Precursor The solid catalyst component used in polymerization was a Ziegler-Natta catalyst component supported on magnesium chloride, containing titanium and diisobutylphthalate as an internal donor. An initial amount of microspheroidal MgCl2.2.8C2H5OH was prepared according to the method described in Example 2 of U.S. Pat. No. 4,399,054 but operating at 3,000 rpm instead of 10,000. The resulting adduct was subjected to thermal dealcoholation at increasing temperatures from 30 to 130° C. in a nitrogen current until the molar alcohol content per mol of Mg is 1.16. Into a 1000 mL four-necked round flask, purged with nitrogen, 500 mL of TiCl4 were introduced at 0° C. While stirring, 30 grams of the microspheroidal MgCl2.1.16C$_2$H5OH adduct were added. The temperature was raised to 120° C. and kept for 60 minutes. During the temperature increase, an amount of diisobutylphthalate was added to produce a Mg/diisobutylphthalate molar ratio of 18. After the 60 minutes, stirring was stopped, the liquid was siphoned off and the treatment with TiCl4 was repeated at 100° C. for 1 hour in the presence of an amount of diisobutylphthalate to produce a Mg/diisobutylphthalate molar ratio of 27. The stirring was stopped. The liquid was siphoned off, and the treatment with TiCl4 was repeated at 100° C. for 30 min. After sedimentation and siphoning at 85° C. the solid was washed six times with anhydrous hexane (6×100 ml) at 60° C.

Catalyst System and Prepolymerization

Before introducing the solid catalyst component into the polymerization reactors, the solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio was equal to 4.

The catalyst system was then subjected to prepolymerization by maintaining the catalyst system in suspension in liquid propylene at 50° C. for about 75 minutes before introducing the catalyst system into the first polymerization reactor.

Polymerization

The polymerization was carried out in continuous in a series of three gas-phase reactors equipped with devices to transfer the product from the first reactor to the second one. Into the first gas phase polymerization reactor a propylene-based polymer (A) was produced by feeding in a continuous and constant flow the prepolymerized catalyst system, hydrogen (used as molecular weight regulator) and propylene, with the components in a gas state. The propylene-based polymer (A) coming from the first reactor was discharged in a continuous flow and, after having been purged of unreacted monomers, was introduced, in a continuous flow, into the second gas phase reactor, together with quantitatively constant flows of hydrogen and ethylene, with the components in a gas state. In the second reactor a copolymer of ethylene (B) was produced. The product coming from the second reactor was discharged in a continuous flow and, after having been purged of unreacted monomers, was introduced, in a continuous flow, into the third gas phase reactor, together with quantitatively constant flows of hydrogen, ethylene and propylene with the components in a gas state. In the third reactor an ethylene-propylene polymer (C) was produced. Polymerization conditions, molar ratio of the reactants and composition of the copolymers obtained are shown in Table 1. The polymer particles exiting the third reactor were subjected to a steam treatment to remove the reactive monomers and volatile substances, and then dried. Thereafter the polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;
Extruder output: 15 kg/hour;
Melt temperature: 245° C.

The stabilizing additive composition was made of the following components:

0.1% by weight of Irganox® 1010;
0.1% by weight of Irgafos® 168;
0.04% by weight of DHT-4A (hydrotalcite);

where the percent amounts refer to the total weight of the polymer and stabilizing additive composition.

The Irganox® 1010 was 2,2-bis[3-[,5-bis(1,1-dimethyl-ethyl)-4-hydroxyphenyl)-1-oxopropoxy]methyl]-1,3-propanediyl-3,5-bis(1,1-dimethylethyl)-4-hydroxybenzene-propanoate while Irgafos® 168 was tris(2,4-di-tert.-butylphenyl)phosphite. The characteristics relating to the polymer composition, reported in Table 2, were obtained from measurements carried out on the extruded polymer, which constituted a stabilized ethylene polymer composition.

TABLE 1

| Polymerization conditions | | | |
|---|---|---|---|
| Example | | | 1 |
| 1st Reactor - component (A) | | | |
| Temperature | ° C. | | 60 |
| Pressure | barg | | 16 |
| $H_2/C_3-$ | mol. | | 0.24 |
| Split | wt % | | 22 |
| Xylene soluble of (A) ($XS_A$) | wt % | | 4.2 |
| MFR of (A) | g/10 min. | | 110 |
| 2nd Reactor - component (B) | | | |
| Temperature | ° C. | | 80 |
| Pressure | barg | | 18 |
| $H_2/C_2-$ | mol. | | 0.81 |
| $C_4-/(C_2- + C_4-)$ | mol. | | 0.25 |
| $C_2-/(C_2- + C_3-)$ | mol. | | 0.98 |
| Split | wt % | | 32 |
| $C_2-$ content of B * | wt % | | 90 |
| $C_4-$ content of B * | wt % | | 10 |
| Xylene soluble of B ($XS_B$) * | wt % | | 16.0 |
| Xylene soluble of (A + B) | wt % | | 12.0 |
| MFR of (A + B) | g/10 min. | | 35.9 |
| 3rd Reactor - component (C) | | | |
| Temperature | ° C. | | 65 |
| Pressure | barg | | 18 |
| $H_2/C_2-$ | mol. | | 0.17 |
| $C_2-/(C_2- + C_3-)$ | mol. | | 0.42 |
| Split | wt % | | 46 |
| $C_2-$ content of C * | wt % | | 52 |
| Xylene soluble of (C) ($XS_C$)* | wt % | | 83 |

Notes:
$C_2-$ = ethylene (IR); $C_3-$ = propylene (IR); $C_4-$ = 1-butene (IR); split = amount of polymer produced in the concerned reactor.
* Calculated values.

The features of the polymer of example 1 are reported in Table 2.

TABLE 2

| Example | | 1 |
|---|---|---|
| component A | | |
| C2 content | wt % | 0 |
| XSA | wt % | 4.2 |
| MFR | g/10 min | 110 |
| split | wt % | 22 |
| component B | | |
| XSB* | wt % | 16 |
| C2 content* | wt % | 90.0 |
| C4 content* | wt % | 10.0 |
| split | wt % | 32 |
| MFR of (A + B) | g/10 min | 35.9 |
| Component C | | |
| XSC* | wt % | 83 |
| C2 content* | wt % | 52 |
| split | wt % | 46 |
| total composition | | |
| MFR | g/10 min | 1.61 |
| IV on soluble in Xylene | dl/g | 2.4 |

C2 ethylene; C4 1-butene;
*calculated

Propylene Homopolymer D).

D1 was a propylene homopolymer having a MFR of 25 g/10 min and a xylene soluble fraction at 25° C. lower than 10 wt %.

D2 is a propylene homopolymer having a MFR of 18 g/10 min and a xylene soluble fraction at 25° C. lower than 10 wt %.

Preparation of the Fibers

Blends of the polyolefin composition prepared in example 1 and component D1 or D2 were prepared. After extrusion the polymers were spun in a Leonard 25 spinning pilot line with screw L/D ratio of 25, screw diameter of 25 mm and compression ratio of 1:3. The line is marketed by Costruzioni Meccaniche Leonard-Sumirago (VA). The operative spinning conditions are here reported.

Operative conditions:
Hole diameter: mm 0.6
Output per hole: g/min 0.6
Hole number in the die: 37
Die temperature (° C.): 250
Melt temperature (° C.): 258.

The properties of the filaments are reported in Table 3.

TABLE 3

|  |  | Fiber 1 | Fiber 2 | Fiber 3 | Fiber 4 |
|---|---|---|---|---|---|
| Component D | Wt % | D1 100 | D1 95 | D2 100 | D2 90 |
| Polyolefin composition | Wt % | 0 | 5 | 0 | 10 |
| MFR fiber | g/10 min | 29.4 | 27.0 | 23.3 | 17.5 |
| Max spinning speed | m/min | 4500 | 3900 | 4500 | 3900 |
| Titer | dTex | 2.20 | 2.25 | 2.15 | 2.15 |
| Tenacity | cN/Tex | 27.5 | 27.3 | 27.3 | 30.3 |
| Elongation at break | % | 260 | 290 | 300 | 300 |
| Softness |  | 870 | 970 | 840 | 920 |

What is claimed is:

1. A polyolefinic fiber comprising:
   from 2 wt % to 20 wt % relative to the total weight of the fiber of a polyolefin composition comprising:
   A) 5-35% by weight of a propylene homopolymer or a propylene ethylene copolymer containing 90% by weight or more of propylene units; component A) containing 10% by weight or less of a fraction soluble in xylene at 25° C. ($XS_A$), both the amount of propylene units and of the fraction $XS_A$ being referred to the weight of A);
   B) 20-50% by weight; of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and
   C) 30-60% by weight of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);
   the amounts of (A), (B) and (C) being referred to the total weight of (A)+(B)+(C), the sum of the amount of (A)+(B)+(C) being 100.

2. The polyolefinic fiber according to claim 1 comprising from 3 wt % to 15 wt % of the polyolefin composition.

3. The polyolefinic fiber according to claim 1 further comprising from 98 wt % to 80 wt %; of a propylene homopolymer or copolymer D) having a fraction soluble in xylene at 25° C. lower than 10 wt %, wherein the sum of the polyolefin composition and the propylene homopolymer or copolymer being 100 wt %.

4. The polyolefinic fiber according to claim 3, wherein component D) is a propylene homopolymer or a propylene copolymer containing from 0.5 wt % to 10 wt %, of ethylene or $C_4$-$C_8$ alpha-olefin derived units.

5. The polyolefinic fiber according to claim 3, wherein component D) is a propylene homopolymer.

6. The polyolefinic fiber according to claim 1, wherein component A) is a polypropylene homopolymer.

7. The polyolefinic fiber according to claim 1, wherein component B) is a copolymer of ethylene and a $C_3$-$C_8$ alpha-olefin containing from 5% to 15% by weight of alpha-olefin units.

8. The polyolefinic fiber according to claim 1 wherein component C) is a copolymer of ethylene and propylene containing from 37% to 65% by weight of ethylene units.

9. The polyolefinic fiber according to claim 1, wherein component (A) has a melt flow rate ISO 1133, 230° C./2.16 kg, ranging between 50 and 200 g/10 min.

10. The polyolefinic fiber according to claim 1, wherein components (A)+(B) blended together have a melt flow rate ISO 1133, 230° C./2.16 kg, ranging between 0.1 and 70 g/10 min.

11. The polyolefinic fiber according to claim 1, wherein the polyolefin composition has a melt flow rate ISO 1133, 230° C./2.16 kg, between 0.5 to 25 g/10 min.

12. The polyolefinic fiber according to claim 3, wherein component D) has a melt flow rate ISO 1133, 230° C./2.16 kg, between 7 to 50 g/10 min.

13. The polyolefinic fiber according to claim 3, wherein component D) has a melt flow rate ISO 1133, 230° C./2.16 kg, between 12 to 40 g/10 min.

14. The polyolefinic fiber according to claim 3, wherein component D) is a propylene ethylene copolymer.

15. The polyolefinic fiber according to anyone of claim 3, wherein component D) is a propylene copolymer containing from 1.0 wt % to 6.0 wt %; of ethylene or $C_4$-$C_8$ alpha-olefin derived units.

* * * * *

UNITED STATES PATENT AND TRADEMARK OFFICE
CERTIFICATE OF CORRECTION

| | | |
|---|---|---|
| PATENT NO. | : 10,767,036 B2 | Page 1 of 1 |
| APPLICATION NO. | : 16/629104 | |
| DATED | : September 8, 2020 | |
| INVENTOR(S) | : Galvan et al. | |

It is certified that error appears in the above-identified patent and that said Letters Patent is hereby corrected as shown below:

On the Title Page

Column 1, Item (30), Line 1, delete "17180217" and insert -- 17180217.6 --, therefor In the Specification In Column 7, Line 41, delete "We" and insert -- Wc --, therefor In Column 8, Line 55, delete "MgCl2.1.16C$_2$H5OH" and insert -- MgCl2 1.16C$_2$H5OH --, therefor Signed and Sealed this
Sixth Day of December, 2022

Katherine Kelly Vidal
*Director of the United States Patent and Trademark Office*